(12) United States Patent
Rosinski et al.

(10) Patent No.: US 9,115,720 B2
(45) Date of Patent: Aug. 25, 2015

(54) DUAL PUMP AND MOTOR WITH CONTROL DEVICE

(71) Applicant: GHSP, Inc., Grand Haven, MI (US)

(72) Inventors: Ryan David Rosinski, Whitehall, MI (US); Larry Duane Ridge, Whitehall, MI (US); Jarvis Kirby, Grand Haven, MI (US); Cathy Ann Stewart, Allendale, MI (US); David Michael Mitteer, Shelby, MI (US)

(73) Assignee: GHSP, INC., Grand Haven, MI (US)

( * ) Notice: Subject to any disclaimer, the term of this patent is extended or adjusted under 35 U.S.C. 154(b) by 329 days.

(21) Appl. No.: 13/664,758

(22) Filed: Oct. 31, 2012

(65) Prior Publication Data

US 2013/0294928 A1 Nov. 7, 2013

Related U.S. Application Data

(60) Provisional application No. 61/642,712, filed on May 4, 2012, provisional application No. 61/662,548, filed on Jun. 21, 2012, provisional application No. 61/665,072, filed on Jun. 27, 2012, provisional application No. 61/665,082, filed on Jun. 27, 2012.

(51) Int. Cl.
*F04B 35/04* (2006.01)
*F04D 13/14* (2006.01)
*F04D 13/06* (2006.01)

(52) U.S. Cl.
CPC ............. *F04D 13/14* (2013.01); *F04D 13/06* (2013.01)

(58) Field of Classification Search
CPC ....... F04D 13/06; F04D 13/14; F04D 29/426; H02K 16/00; H02K 16/02; H02K 5/128; H02K 5/1282; H02K 5/1285; H02K 5/1232

USPC ................. 417/350, 423.5, 366; 310/114, 43
See application file for complete search history.

(56) References Cited

U.S. PATENT DOCUMENTS

| | | | |
|---|---|---|---|
| 2,700,343 A | 1/1955 | Pezzillo, Jr. | |
| 3,083,893 A | 4/1963 | Dean | |
| 3,272,129 A | 9/1966 | Leopold | |
| 3,347,168 A * | 10/1967 | Nixon | 417/350 |
| 4,105,372 A | 8/1978 | Mishina et al. | |
| 4,164,852 A | 8/1979 | Anzalone | |
| 4,229,142 A * | 10/1980 | Le Dall et al. | 417/38 |
| 4,644,207 A | 2/1987 | Catterfeld et al. | |
| 4,971,535 A | 11/1990 | Okada et al. | |

(Continued)

FOREIGN PATENT DOCUMENTS

| | | |
|---|---|---|
| WO | 91/18206 A1 | 4/1991 |
| WO | 01/59288 A2 | 8/2001 |
| WO | 2004/098677 A1 | 11/2004 |

*Primary Examiner* — Charles Freay
(74) *Attorney, Agent, or Firm* — Price Heneveld LLP

(57) ABSTRACT

The present pump devices provide a dual pump using two (or more) electric motors (e.g. brushless DC motors) driving the pumps independently, including integration of hydraulic and electrical components and connectors. The illustrated arrangements include an in-line single shaft version, a parallel separate shaft version, and an inside-outside version. Each configuration includes a housing supporting formation of: shared structural support for the pumps and motors (e.g., bearings, stator, relationship of components), fluid pump and hydraulic system (e.g., fluid passageways, ports connectors) and motor electrical control (e.g., control circuitry and sensory components).

9 Claims, 17 Drawing Sheets

Over Under

(56) References Cited

U.S. PATENT DOCUMENTS

| | | |
|---|---|---|
| 5,139,397 A | 8/1992 | Strelow |
| 5,178,520 A | 1/1993 | Strelow |
| 5,197,865 A | 3/1993 | Sevrain et al. |
| 5,785,013 A | 7/1998 | Sinn et al. |
| 5,957,666 A | 9/1999 | Lee |
| 6,193,473 B1 | 2/2001 | Mruk et al. |
| 6,220,832 B1 | 4/2001 | Schob |
| 6,316,858 B1 * | 11/2001 | Phillips ................. 310/114 |
| 6,422,838 B1 | 7/2002 | Sloteman |
| 6,425,244 B1 | 7/2002 | Ohashi et al. |
| 6,663,362 B1 * | 12/2003 | Lentz et al. ............. 417/423.7 |
| 6,672,846 B2 | 1/2004 | Rajendran et al. |
| 6,682,312 B1 | 1/2004 | Ward |
| 6,710,492 B2 | 3/2004 | Minagawa |
| 6,736,605 B2 | 5/2004 | Ohashi et al. |
| 6,768,237 B1 * | 7/2004 | Schroedl ................ 310/114 |
| 6,860,349 B2 | 3/2005 | Ogawa et al. |
| 7,278,833 B2 | 10/2007 | Higashiyama et al. |
| 7,682,136 B2 | 3/2010 | Donoho, II et al. |
| 7,704,054 B2 | 4/2010 | Horvath et al. |
| 7,806,667 B1 | 10/2010 | Hauser et al. |
| 7,942,649 B2 | 5/2011 | Lesther et al. |
| 8,210,829 B2 | 7/2012 | Horvath et al. |
| 8,368,283 B2 | 2/2013 | Kim et al. |
| 2005/0103286 A1 | 5/2005 | Ji |
| 2007/0065314 A1 * | 3/2007 | Nagata et al. ............. 417/423.1 |
| 2010/0139582 A1 | 6/2010 | Bilezikjian et al. |
| 2010/0158703 A1 * | 6/2010 | Hattori et al. ............... 417/50 |
| 2010/0262301 A1 | 10/2010 | Schwartz et al. |
| 2011/0048390 A1 | 3/2011 | Washburn |
| 2011/0052433 A1 | 3/2011 | Huang |
| 2011/0116954 A1 | 5/2011 | Hong et al. |
| 2011/0120394 A1 | 5/2011 | Onozawa et al. |
| 2011/0123370 A1 | 5/2011 | Kim et al. |
| 2011/0142690 A1 | 6/2011 | Shimizu et al. |
| 2011/0265742 A1 | 11/2011 | Choi et al. |
| 2013/0093276 A1 | 4/2013 | Kim |

* cited by examiner

Over Under

Side by Side

Side by Side

Inline

Over Under

Inline

Inline

Inline

Inline

Inline

Inline

Inline

Inline

Inline

Inline

Side by Side

Side by Side

Side by Side

Side by Side

Side by Side

Side by Side

| BOM | |
|---|---|
| Name | Qty |
| Auxiliary Upper Volute | 1 |
| Auxiliary Rotor Assembly | 1 |
| Auxiliary Stator Assembly | 1 |
| Auxiliary Pump Shaft | 1 |
| Main Pump Shaft | 1 |
| Main Stator Assembly | 1 |
| Main Rotor Assembly | 1 |
| Main Upper Volute | 1 |
| PCB Cover | 1 |
| PCB | 1 |
| Motor Terminals | 6 |
| Housing Overmold | 1 |

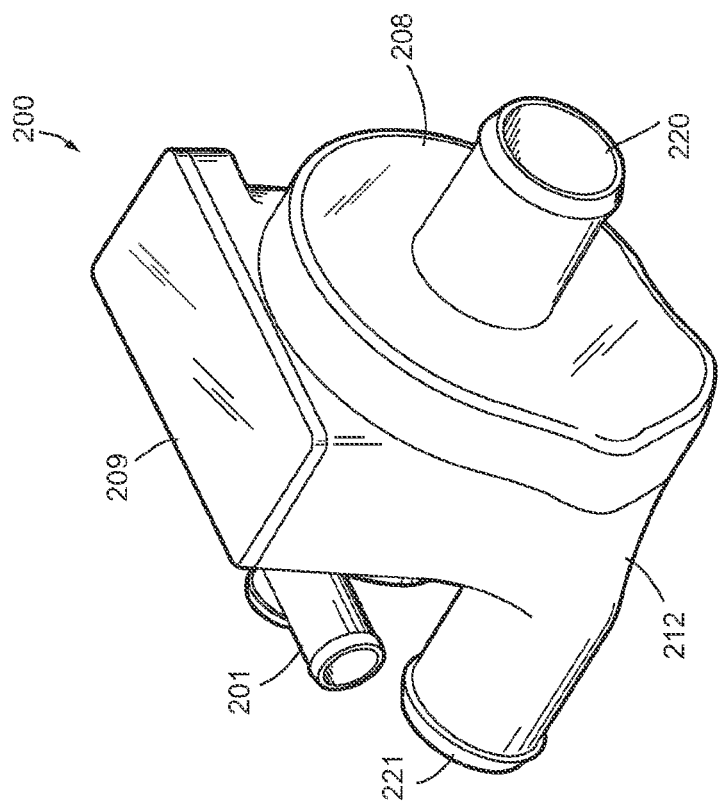
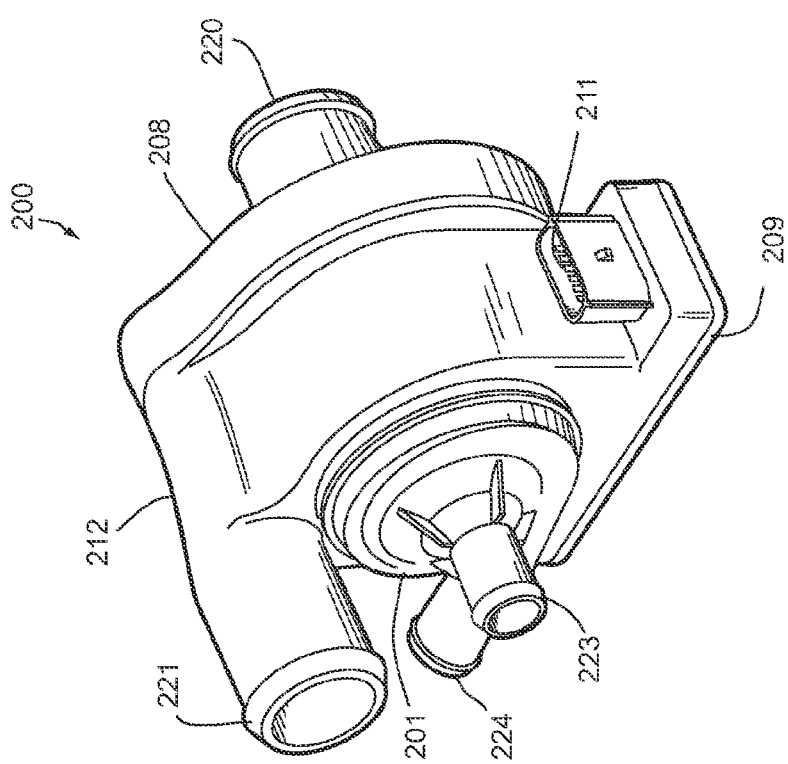

Over Under

Over Under

Over Under

Over Under

Over Under

Over Under

Over Under

Over Under
Stator

Over Under
Lamination

Over Under

DUAL PUMP AND MOTOR WITH CONTROL DEVICE

CROSS-REFERENCE TO RELATED APPLICATIONS

This is a non-provisional application claiming benefit of a filing date of each of Ser. No. 61/642,712, Filing Date May 4, 2012, entitled TANDEM MOTOR AND PUMP AND CONTROL DEVICE; Ser. No. 61/662,548, Filing Date Jun. 21, 2012, entitled SHARED-SHAFT TANDEM MOTOR, PUMP AND CONTROL DEVICE; Ser. No. 61/665,072, Filing Date Jun. 27, 2012, entitled SIDE-BY-SIDE TANDEM MOTOR, PUMP AND CONTROL DEVICE; and Ser. No. 61/665,082, Filing Date Jun. 27, 2012, entitled INSIDE-OUTSIDE TANDEM MOTOR, PUMP AND CONTROL DEVICE.

BACKGROUND

The present invention relates to integrated dual motor and pump devices, where the device includes at least two pumps operated independently by separate brushless DC motors and incorporated into a unitary housing with a common controller board providing for optimized function, features, and characteristics for defined and minimized package space and minimized assembly cost and time and components, while being optimized for operation.

Dual piggyback-type pump devices are known. However, improvements are desired in optimizing their function, features, and characteristics for small package space and minimized assembly. For example, there is a desire for reduced cost of manufacturing, reduced number of individual parts, less assembly time, and less material handling and inventorying of parts and components. Further, an efficient design is desired that uses less total material, that is more integrated, and that take greater advantage of common use of components (e.g., electrical connectors). Also, minimization of package space, while maintaining independent control and operation of the motors and pump sets, including a capability of variable output, is desired to provide significant competitive advantages. It is preferable that all of this be done while maintaining design flexibility and a robustness of the design.

SUMMARY OF THE PRESENT INVENTION

In one aspect of the present invention, a device comprising a unitary housing, at least two pumps, and at least one electric motor operably connected to each pump and supported for operation by the housing. The housing forms fluid passages to and from each pump, and also supports at least part of a motor control circuit for each motor.

In a narrower form, the device includes a single shaft supporting the pumps and motors.

In a narrower form, the device includes a side-by-side shafts supporting the pumps and motors.

In a narrower form, the device includes a first motor positioned at least partially within a second motor in an inside-outside relationship.

Related methods are also contemplated to be within a scope of the present invention.

The unitary housing structural details as disclosed herein are also contemplated to be within a scope of the present invention.

An object of the present invention is to provide an integrated device that provides two (or more) independently controlled fluid flow functions, and provide on-board electrical control to vary the flow rate for each fluid circuit.

An object of the present invention is to provide a flexible design allowing fluid connections to be integrally made (such as an inlet and an outlet for each of different fluid circuits).

An object of the present invention is to provide a housing integrally formed to support the entire device for mounting to a selected application (such as a vehicle), including incorporating brackets or mounting features without the need for secondary components.

In one aspect of the present invention, a device comprising a housing, at least two pumps, a single shaft, and at least one electric motor operably connected to each pump and supported on the shaft for operation within the housing. The housing forms at least a portion of fluid passages to and from each pump, and also supports at least part of a motor control circuit for each motor.

In another aspect of the present invention, a pump device includes a first and second motors each including stator and rotor, a single shaft for supporting the rotors, and a uni-body holding the stators of the first and second motors in alignment with the single shaft with the rotors of the first and second motors rotatably supported on the single shaft. The device further includes a pump on each rotor, and a control circuit operably connected to the first and second motors and supported by the uni-body.

In one aspect of the present invention, a device comprising a housing, at least two pumps, associated side-by-side shafts, and at least one electric motor operably connected to each pump and supported on an associated one of the shafts for operation within the housing. The housing forms at least a portion of fluid passages to and from each pump and also supports at least part of a motor control circuit for each motor.

In another aspect of the present invention, a pump device includes first and second motors each including a stator and a rotor, associated side-by-side shafts supporting the rotors, and a uni-body holding the stators of the first and second motors with the shafts in parallel and with the rotors of the first and second motors rotatably supported on the parallel shafts. The device further includes a pump on each rotor and a control circuit operably connected to the first and second motors and supported by the uni-body.

In one aspect of the present invention, a device comprising a housing, at least two pumps, and at least one shaft. The device includes an inside electric motor and an outside electric motor operably connected to different ones of the pumps and supported within the housing on the at least one shaft for operation within the housing, the housing forming at least a portion of fluid passages to and from each pump and at least part of a motor control circuit for each motor supported by the housing.

In another aspect of the present invention, a pump device includes an inside first motor and an outside second motor, each including a stator and a rotor, with a portion of the first motor being substantially inside the outside second motor, at least one shaft supporting the rotors, and a uni-body holding the stators of the first and second motors with the rotors of the first and second motors rotatably supported on the at least one shaft. The apparatus further includes a pump on each rotor and a control circuit operably connected to the first and second motors and supported by the uni-body.

In another aspect of the present invention, a pump device includes a uni-body, and an inside first motor and an outside second motor, each including a rotor but sharing a common stator that is wound for the inside motor in one configuration and is wound for the outside motor in another configuration. The device further includes a pump on each motor, and a control circuit operably connected to the first and second motors for independent operation and that is supported by the uni-body.

These and other aspects, objects, and features of the present invention will be understood and appreciated by those skilled in the art upon studying the following specification, claims, and appended drawings.

BRIEF DESCRIPTION OF DRAWINGS

FIGS. 25-26 are left and right perspective views of an inside-outside dual motor and pump device embodying the present invention, with the inside motor being physically substantially inside the outside motor and with the pumps having inlets at opposing ends of the device and outlets extending in perpendicular directions;

DETAILED DESCRIPTION OF PREFERRED EMBODIMENTS

A device embodying the present invention includes an integrated dual motor and pump device, where the device includes at least two pumps operated independently by separate brushless DC (BLDC) motors and incorporating a unitary housing with optimized function, features, and characteristics for defined package space and minimized assembly cost and time and components, while being optimized for operation. The integration of the device allows optimization of functions, features, and characteristics of both motors and pumps in the device, including a capability of designing for small package space and minimized assembly. For example, the present integrated unitary housing allows reduced cost of manufacturing, reduced number of individual parts, less assembly time, and less material handling and inventorying of parts and components, since the integrated unitary housing can be overmolded in a single overmold operation (or in a double overmold operation). Further, the unitary housing allows use of less total material (less total mass of the device), and provides a more integrated and optimized design that take greatest advantage of common use of components (e.g. electrical connectors) while taking optimal advantage of polymeric materials in the housing (such as by forming multiple fluid passageways with less total polymeric material). Also, the integrated design allows minimization of package space. Still further, a single integrated circuit can be encapsulated or housed or carried by the housing, where the integrated circuit is capable of managing and controlling each motor independently.

Figure 3:
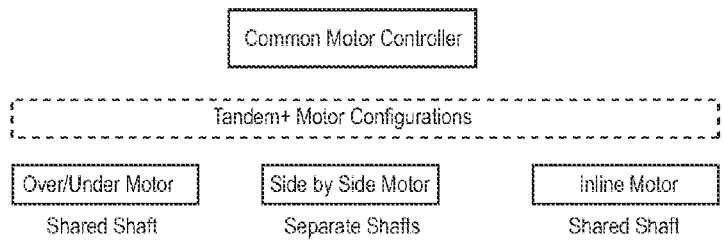
FIG. 3 is a side view of an over/under shared shaft motor and pump device embodying the present invention, one motor being inside a second motor.

Thus, the illustrated two pumps can be controlled for independent operation and variable output, providing significant operating efficiencies to the product in which the dual motor and pump device (also called "tandem motor and pump device") is attached. The present device maintains design flexibility and a robustness of the overall design capabilities. Several different arrangements are shown herein, including an over/under motor with a single shaft version (FIG. 3), a parallel separate shaft version (FIGS. 4-5), and an in-line version (FIGS. 6-7). Each of these configurations support formation of shared fluid ports shared electrical connector(s) and control circuitry and sensory components. Also, the present arrangements can be ganged (or combined) for even greater efficiency of operation.

Figure 1:
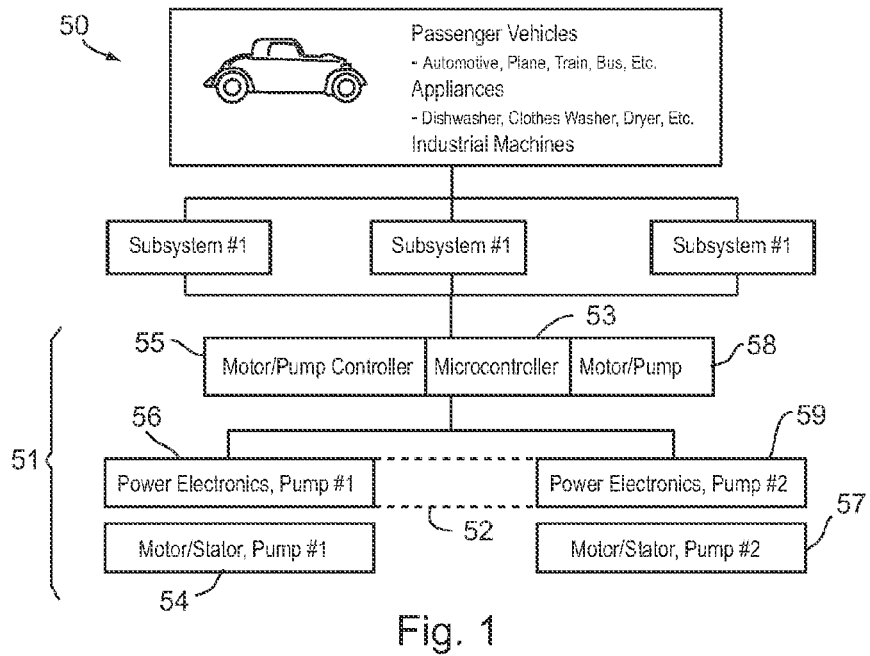
FIG. 1 is a chart showing potential applications having multiple functional subsystems requiring fluid flow, and shows an integrated motor and pump device for satisfying at least two of the subsystems.
Figure 2:
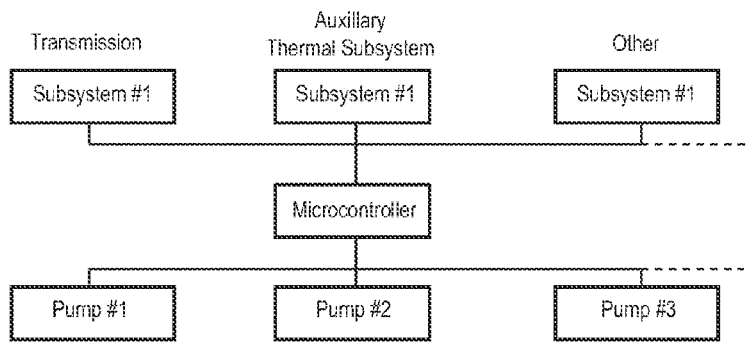
FIG. 2 is a chart similar to FIG. 1, but showing a device with three or more pumps for satisfying multiple subsystems.

FIG. 1 shows that the present devices can be used in many different applications where multiple fluid systems are present. The different applications include, but are not limited to passenger vehicles (including automotive), aeronautical (including planes), nautical (including boats, yachts, ferries), mass transit vehicles (including buses), appliances (including but not limited to dishwashers, and clothes washers), industrial machines (part washers, and fluid-using industrial processes), and the like.

As illustrated in FIG. 1, the selected application 50 includes three subsystems #1, #2, and #3. The present device 51 includes a dual motor and pump with integrated controller for moving fluid independently in each of the three subsystems. Specifically, the device 51 includes a first motor 54 and first pump 55 connected to a first sub-circuit 56 (also called "power electronics") of a control circuit in a controller 52, and also includes a second motor 57 and second pump 58 connected to a second sub-circuit 59 of the control circuit of the controller 52. The controller 52 is capable of receiving control information from a microcontroller 53, where the microcontroller 53 is located either on the device itself, or is separate from the device and operably connected to the controller 52 by electrical connectors on a housing of the device 51.

The housing of the device 51 includes an integrally unitary molding of polymeric material, such as a polymeric material having a high heat transfer capability. The housing is overmolded onto the motors and pumps, either in a single overmolding process or in a double overmolding process, and includes forming components and features and characteristics for efficient operation. Note FIGS. 3, 4-5, and 6-7 which show three different configurations of the housing. It is contemplated that the overmolded housing will form structural attachments (such as apertured flanges) for attaching the device to a specific application 50, and form fluid passageways (including input and output connector ports) for the fluid communication to and from each pump, and form structural support and accurate relational positioning of components (such as positions of the rotor and stator of the motor and positions of bearings and other support relative to the pump), and form portions of each of the pumps, and provide support and protection for the controller 52 (and related circuitry).

As shown in FIG. 1, the first motor/first pump are operably connected to the subsystem #1. Also, the second motor/second pump are operably connected to the subsystems #2 and #3. (It is contemplated that additional subsystems could be added, as shown by dashed lines in FIG. 1.) It is contemplated that the subsystems #2 and #3 can include a solenoid and valve or variable restrictor or other means to control a relationship of flow through the subsystems #2 and #3 if necessary or desired.

The present innovative design allows flexibility in design of the housing. For example, fluid channeling (fluid passageways) can be optimized, to reduce 90 degree bends to provide gradual flow changes, or filing and tailored channeling or contouring of channels (fluid passageways). It also allows integration of sensors, including accurate positioning without secondary attachment. For example, it is contemplated that the sensors may include, but are not limited to, thermocouples and thermistors, flow meters, pressure transducers, accelerometers, and viscosity sensors. Also, the present innovation allows sensorless commutation, alternative termination techniques, and integration of volute to any interface (such as a valve body, etc). Connectors and couples for electrical communication can be provided for the entire mechatronic unit, including solenoids, valves, auxiliary motors, all connected through a single connector. This allows an overall reduction in the number of components, and a reduction in assembly time and time for connecting the device 50 once attached to a specific application 50. The present design allows for electromagnetic bonding and also adhesive assembly. Where the in-line version motor/pump is used (see FIGS. 6-7), a single shaft can be used for both pumps, with two different stators being overmolded or assembled into a same assembly. Where an inwound/outwound version motor/pump is used (see FIG. 3), a shared stator or separate stators stacks with line-to-line-fit OD and ID surfaces can be used.

The overmolded housing can integrally form a volute for an interface, including for example a volute shaped to operably receive (and couple to) a customer valve body or auxiliary manifold. Multiple subsystems controls can be constructed using the present innovation, such as a single control electronics module for controlling multiple mechatronic elements (valves, auxiliary pumps, solenoids, etc). Also, the controls can provide management of multiple subsystems requirements and initiate appropriate hydraulic response (such as for coolant, oil pressure, etc). Also, the controls can reduce a total number of vehicle harnessing and connectors, reduce wiring, and simplify systems, thus greatly reducing total cost, total number of components, and reducing manual assembly time. Optimized sensors integrated into the control system provide direct feedback response, such as pressure, flow, temperature, viscosity, acceleration, and other fluid data. The overmolded housing allows fluid channeling optimization, including contouring and location of flow paths to reduce abrupt turns, optimize gradual flow path bending while minimizing overall length of the flow path and minimizing material mass necessary to form the flow path channeling. An additional benefit is that the system cools electronics and the motor(s) using proximity of pumped fluid as a heat transfer medium, thus removing heat from the motor and electronics, to thus increase service life and improve overall operation.

FIGS. 3, 4-5, and 6-7 illustrate three different contemplated motor/pump configurations. Each of these designs are IP69 compliant, with improved sealability of fluids (i.e., low likelihood of leakage) over known fluid pump systems. They each are capable of incorporating different style bearings and/or bushings. They offer reduced package size, reduced total mass, reduced noise during operation as well as reduction of total components. They each offer excellent thermal management, particularly when a thermally-conductive polymer is used, such as a polymer having a thermal conductivity of more than 0.02 w/m·K at 25 degrees C. Overmolding of the housing allows two or more stators to be integrated into and securely positioned in a single overmold step. Sensors can also be integrated in the overmold step, such as from lead frame to media stream direct sensors. A wide range of termination techniques can be used, including compliant pin, IDC, fusing, and welding. Sensorless commutation is supported by this design innovation, as well as electromagnetic bonding and/or adhesive assembly.

Figure 4:
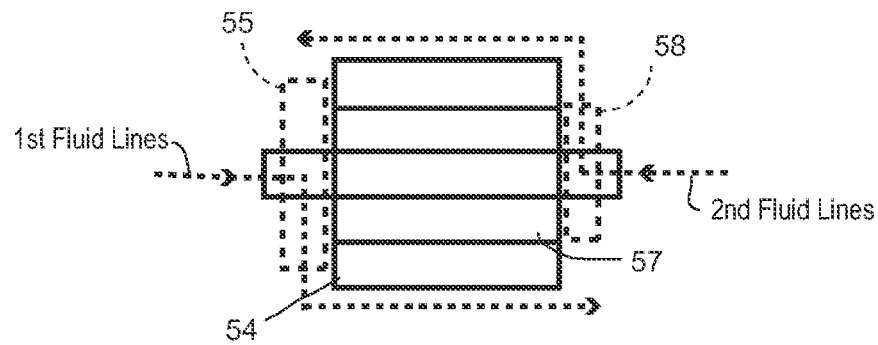
FIG. 4 is a side schematic view of the inline dual-motor pump device noted in FIG. 3.

FIG. 4 illustrates an over/under motor and pump arrangement. A single stator is fixed by the overmolded housing, and a first rotor/motor is formed inside, and a second rotor/motor is formed outside. A single shaft is provided, with a first pump at a first end of the device (right side of the drawing), and a second pump at an opposite left end of the device (left side of the drawing). Fluid flow is shown by dashed line. The motors and pumps are supported for independent rotation on the shaft and for independent operation.

Figure 5:
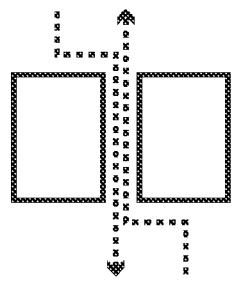
FIGS. 5-6 are side and end view schematic views of the side by side dual-motor pump device noted in FIG. 3.
Figure 6:
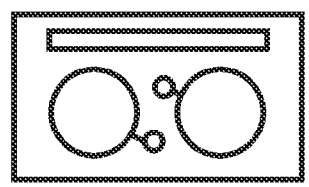
Figure 7:
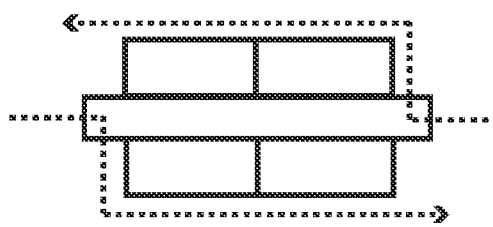
FIG. 7 is a side schematic view of the inline dual-motor pump device noticed in FIG. 3.
Figure 8:
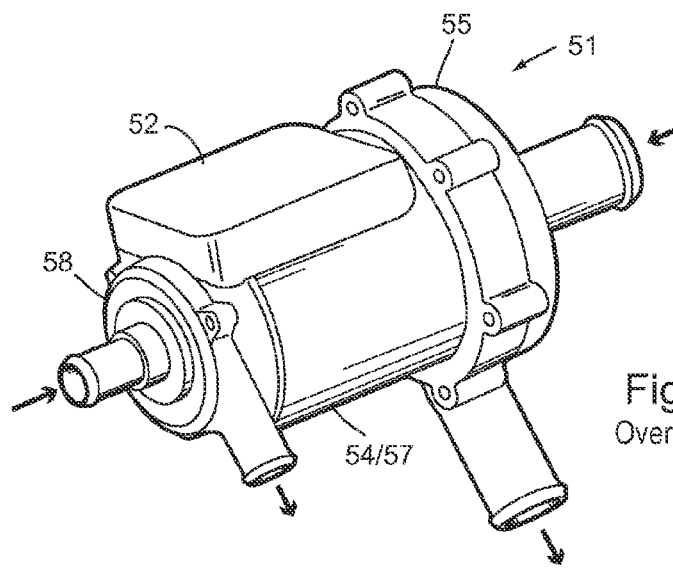
FIGS. 8-10 are three different perspective views of a prototype of the in-line dual-motor pump device like that described and shown in FIG. 4.

FIGS. 5-6 illustrates a side by side motor and pump arrangement. In this arrangement, the housing integrally forms adjacent motors (with axes of the motors extending in parallel directions), and further supports all bearings and structural support for operation of the two side-by-side motors. The housing also defines fluid passageways and other structure required for supporting operation of the pumps. As illustrated, the pumps are located at opposite ends of the housing, and communicate fluid along a center plane of the housing. It is noted that a balance and "counterflow" design of this version can provide benefits of noise and vibration reduction. Also, this design positions significant mass at critical areas, such as around bearings at opposite ends of each motor shaft. At the same time, the present arrangement minimizes mass in non-critical areas, such as the minimal slug of material along a center of the housing in between the two different fluid passageways, which slug forms both a portion of the upper passageway and also a portion of the lower passageway in a manner minimizing total material mass.

FIG. 7 illustrates an in-line motor and pump arrangement. In this arrangement, the overmolded housing forms the two motors on opposite ends of a shared shaft. In this arrangement, each motor and associated pump ride on opposite ends of the common shaft. However, the motors and pumps are operably independent of the shaft, such that they provide independent pumping capability, and capacities.

The present devices provide two (or more) independently controlled fluid flow functions, and provide on-board electrical controls to vary the flow rate for each fluid circuit. They also provide a way to form flexibly-designed fluid connections (such as an inlet and an outlet along with leak-free connecting structure for each of two different fluid circuit). The housing is integrally formed to support the entire device for mounting to a selected application (such as a vehicle), including incorporating brackets or mounting features without the need for secondary components. The device is complete and highly fluid-leak resistant when properly connected, due to its integrated design.

The present innovative designs provide a dual pump using two brushless DC (BLDC) motors driving pumps independently, including hydraulic integration. This is accomplished via several arrangements including an inside/outside motor version (FIG. 4), parallel separate shaft version (FIGS. 5-6), and an in-line version (FIG. 7). Each of these configurations include a housing supporting formation of fluid ports, shared electrical connector(s) and control circuitry and sensory components. Also, the present arrangements can be ganged (or combined) for even greater efficiency of operation It is contemplated that a scope of the present invention includes, for example, a housing; a microcontroller; two pumps, two independently controlled motors, and includes one or more of:

wherein the housings overmolded into a single unitary component and encapsulates at least part of the two motor assemblies; and/or wherein the housing is molded using a thermally conductive polymer; and/or wherein the housing contains fluid channels to remove heat from the motors and electronics; and/or wherein the housing contains fluid channels porting the pumped media from at least one integrated pump to remove heat from the motors and electronics; and/or wherein the housing contains electrical leads that interconnect to each motor; and/or wherein the housing contains electrical interconnects to at least one auxiliary devices in addition to the motor controllers (e.g., valve body, clutch, switches, or etc.); and/or wherein the housing contains mounting features to integrate fluid output ports in a communicative fluid arrangement with a subsystem; and/or wherein the microcontroller has at least one master microcontroller and one slave microcontroller independently controlling at least one motor per controller; and/or wherein the microcontroller has at least two motor driver circuits independently controlling at least two motors; and/or wherein the housing includes fluid channeling to enhance laminar flow of media, reduce turbulence in pumped fluid; and/or wherein the housing includes sensor position cavities, retaining features and electrical interconnects to the sensor; and/or wherein the sensor monitors and provides feedback to the microcontroller for at least one motor or pump performance characteristic; and/or wherein the motor resonances are matched to offset resonance vibration from the motor and/or environmental influences; and/or wherein the motor acoustic frequencies are matched to dampen acoustical noise from the other motors and/or environmental influences; and/or wherein the motors are controlled through multiple microprocessors and drive circuits onboard a single printed circuit board assembly mounted within the housing, potentially within a vehicle or subsystem; and/or wherein the motors are controlled through multiple microprocessors and drive circuits onboard a single printed circuit board assembly mounted within a vehicle or subsystem; and/or wherein the motors are controlled through a master microprocessor receiving commands from at least one subsystem, and at least one slave microprocessor configured to receive commands from the master microprocessor, the circuits onboard a single printed circuit board assembly mounted within the housing; and/or wherein the motors are controlled through an integrated motor controller processor with discrete drive circuits onboard a single printed circuit board assembly mounted within the housing; and/or wherein polymer fillers and flow direction of the polymer during injection molding are designed and oriented such that thermal transfer is optimized to add or remove heat from targeted areas of the housing along predetermined heat flow paths (such as heat conduction along oriented glass fibers for optimal performance).

Modification

The present device 70 (FIGS. 9-10) is a further-improved device similar to the device shown in FIGS. 6-7. The device 70 is a shared-shaft dual motor, double-pump, and single-control arrangement including a single shaft 71 (FIG. 12) with first and second motors 72 and 73 adjacently positioned on each end. The motor 72 includes a rotor 74, a stator 75 with windings 76, and an end-mounted circuit/sensor/connector board 77 (also called "end plate") for sensing a position and controlling operation of the rotor 74 for motor control. The motor 73 includes a rotor 80, stator 81 with windings 82, and an end-mounted circuit/sensor/connector board 83 for sensing a position and controlling operation of the rotor 80. A uni-body 85 (also called a "housing") of polymeric material is over-molded onto and encapsulates a majority of the stators 75 and 81 and holds them in an aligned position on the shaft 71. Notably, the rotor-interfacing surfaces of the stators 75 and 81 are not covered with polymeric material, thus providing optimal close interfaced operation with an outer surface of the rotors 74 and 80. Electrical contact tabs 86 and 87 extend through the uni-body 85 for connection to a printed circuit board (PCB) controller 88 (FIGS. 12, 18), which provides on-board control over the motors 72, 73. A cover 89 covers the PCB controller 88.

Pumps 90 and 91 are formed at outboard ends of the motors 72, 73, respectively. The first pump 90 includes an impeller 92 on an end of the rotor 74 for rotation on the shaft 71, and includes a pump head 93 covering an outer surface of the impeller 92. The illustrated impeller 92 can be a separate part or can be formed from over-molded polymeric material that also encapsulates magnets and other components of the rotor 74. Notably, the present innovation is believed to encompass several ways for forming and/or attaching the impeller. For example, the impeller can be a two-piece or multi-piece assembly or a unitary molding by itself, or a unitary molding that also forms part of the rotor itself. The pump head 93 defines an inlet 94 with centered axial liquid passageway to the impeller 92 (including a lip 95 for secure connection to a hose or conduit), a pump chamber 96 with an end of the uni-body 85, passageways 97 (see also FIG. 11) extending axially along the uni-body 85 including portions near the PCB controller 88, and an outlet 98 (FIG. 9) with retainer lip 99, the outlet 98 extending from the uni-body 85 at an end opposite the inlet 94. The passageways 97 are configured to cool the PCB controller 88 simultaneous with pumping the liquid. For example, the liquid being pumped by pump 90 might be radiator antifreeze for cooling a combustion engine of a passenger vehicle.

The second pump 91 includes an impeller 102 attached to an outboard end of the rotor 80 for rotation on the shaft 71, and includes a pump head 103 covering an outer surface of the impeller 102. The illustrated impeller 102 is formed from over-molded polymeric material that also encapsulates an inner portion of the rotor 80. As noted above, the present innovation is believed to encompass other ways for forming and/or attaching the impeller. For example, the impeller can be a two-piece assembly or a unitary molding by itself, or a unitary molding that also forms part of the rotor itself. The pump head 103 defines an inlet 104 with centered axial liquid passageway to the impeller 102 (including a lip 105 for secure connection to a hose or conduit), a pump chamber 106 with an end of the uni-body 85, a passageways 107 extending tangentially from the uni-body 85 and rotor 80, and an outlet 108 (FIG. 9) with retainer lip 109, the outlet 108 extending from the uni-body 85 at a same end as the outlet 98. For example, the liquid being pumped by pump 91 might be transmission fluid for cooling a transmission for a combustion engine of a passenger vehicle.

Figure 9:
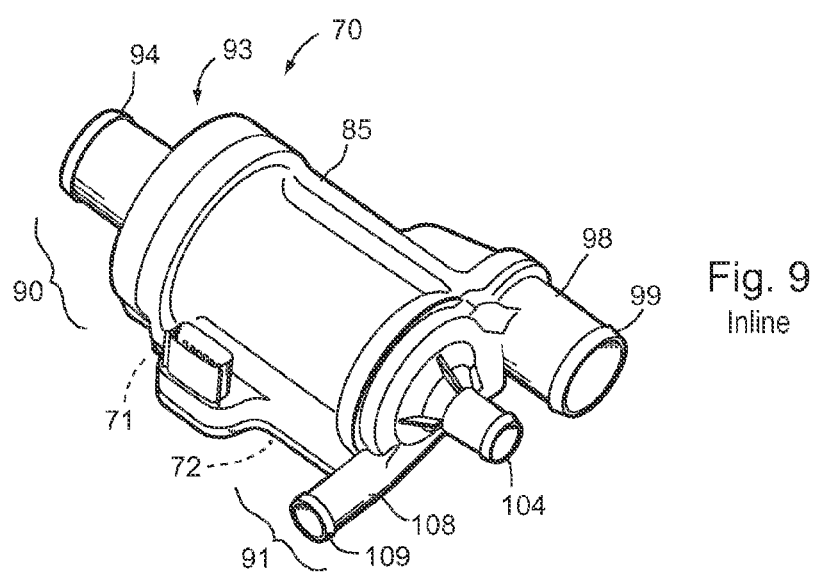
Figure 10:
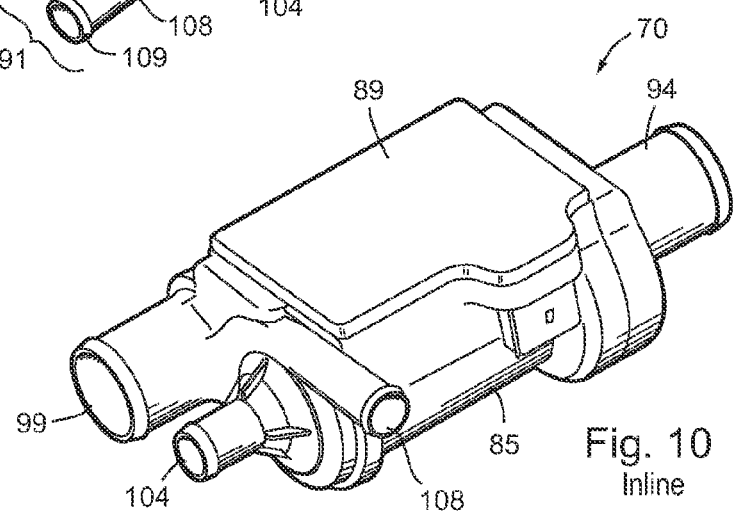
Figure 11:
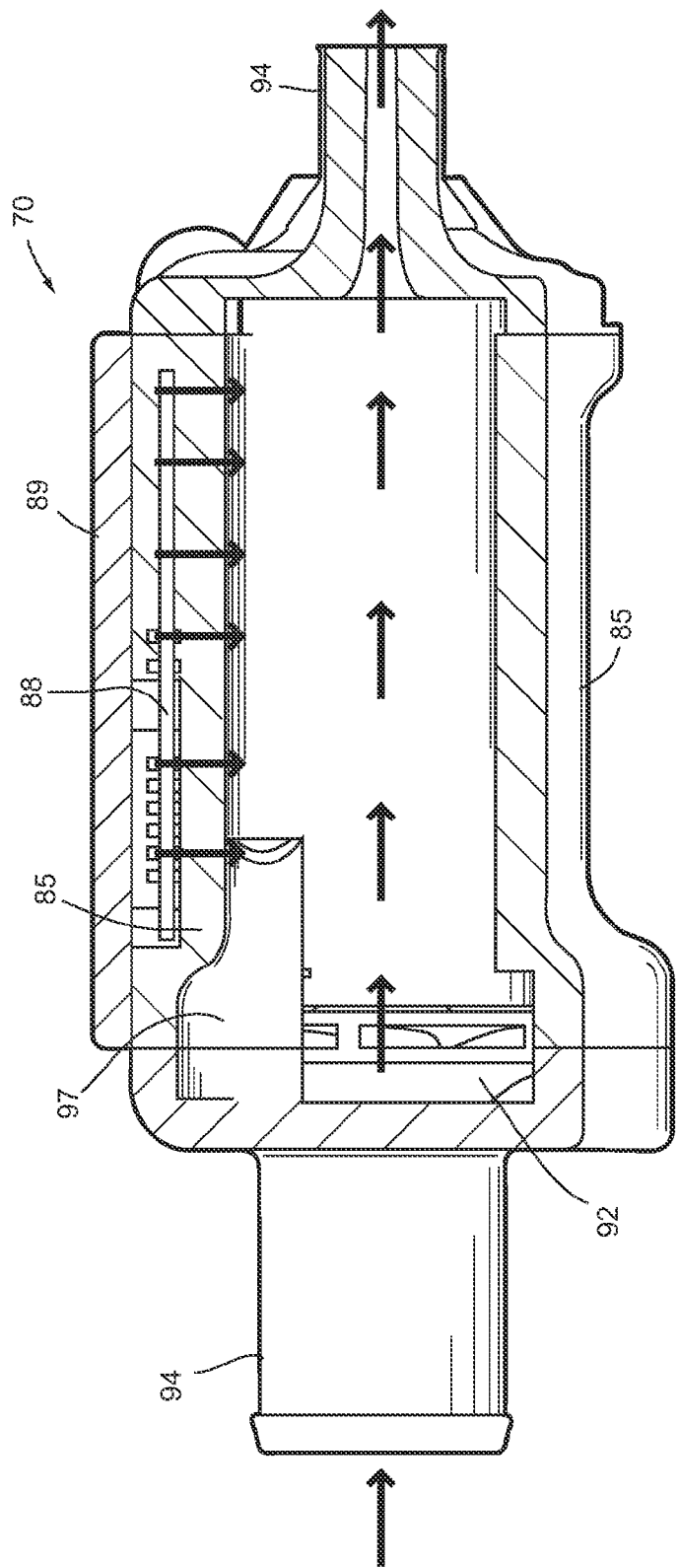
FIG. 11 is a longitudinal cross section of the device of FIGS. 9-10, showing a flow of fluid through a first pump and showing cooling of the printed circuit board (PCB) control.

FIG. 11 is a longitudinal cross section of the device of FIGS. 9-10, showing a flow of fluid through the first pump 90 and showing cooling (see red parallel lines extending from the PCB controller 88 toward the passageway 97) of the printed circuit board (PCB) controller 88. It is noted that the illustrated rotors 74 and 80 ride on a thin film of liquid covering the shaft 71. It is contemplated that other style bearing arrangements or bearing systems could be incorporated if desired.

Figure 12:
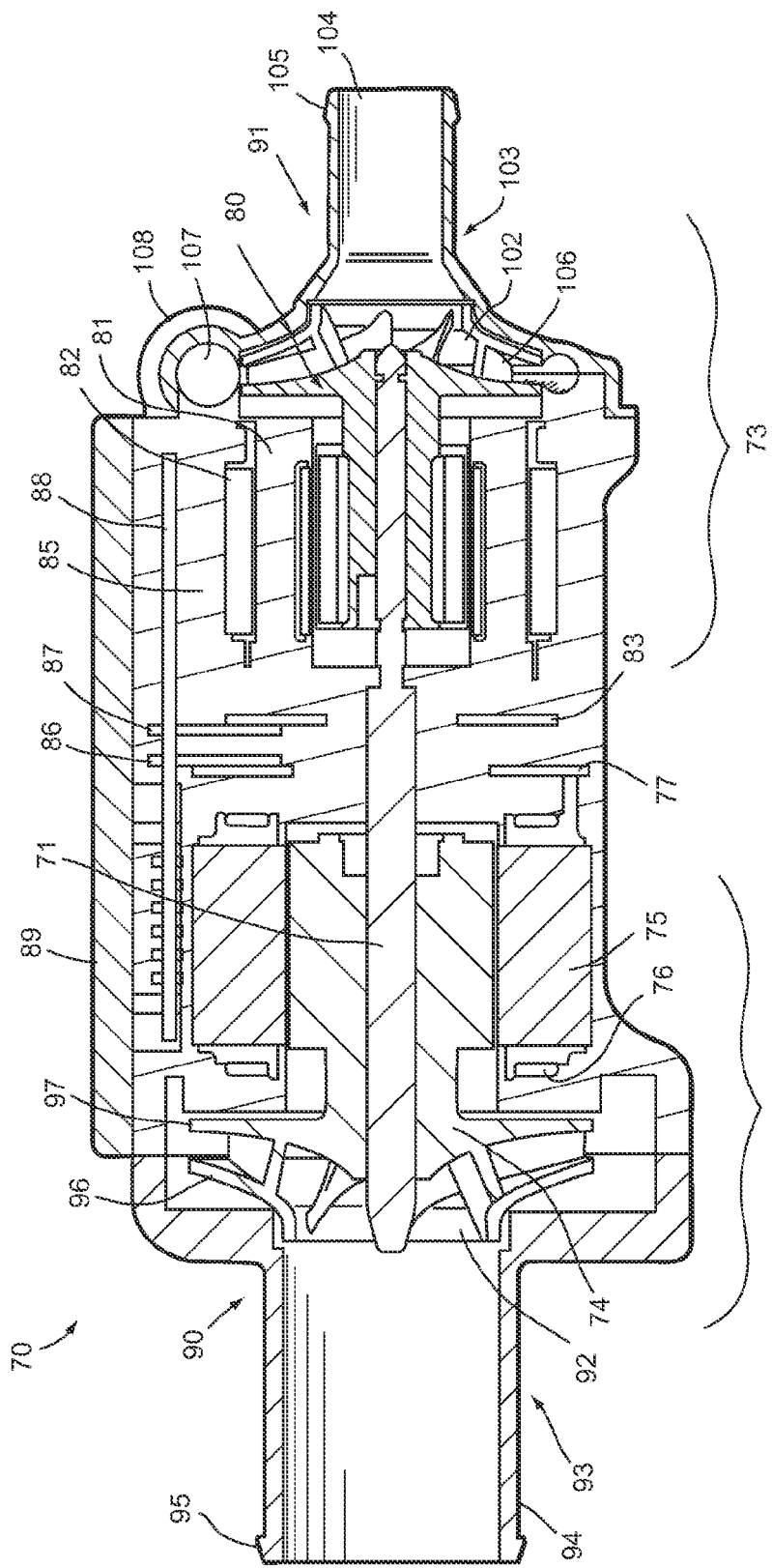
FIG. 12 is a longitudinal cross section of the device of FIGS. 9-10, showing a flow of fluid through a second pump.

FIG. 12 is a longitudinal cross section of the device of FIGS. 9-10 along an axial centerline of the assembly, including a showing of a flow of fluid through the second pump 91.

Figure 13:
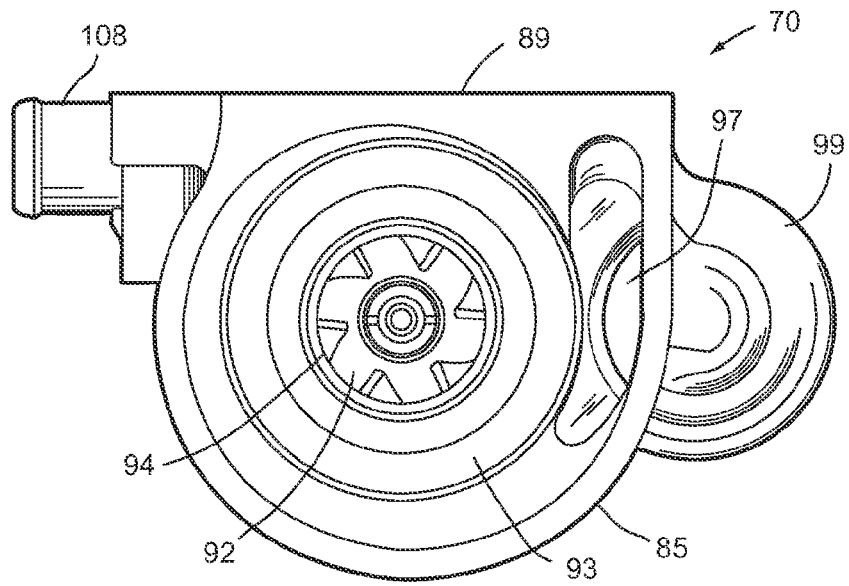
FIGS. 13-14 are end views of the device in FIGS. 9-10.
Figure 14:
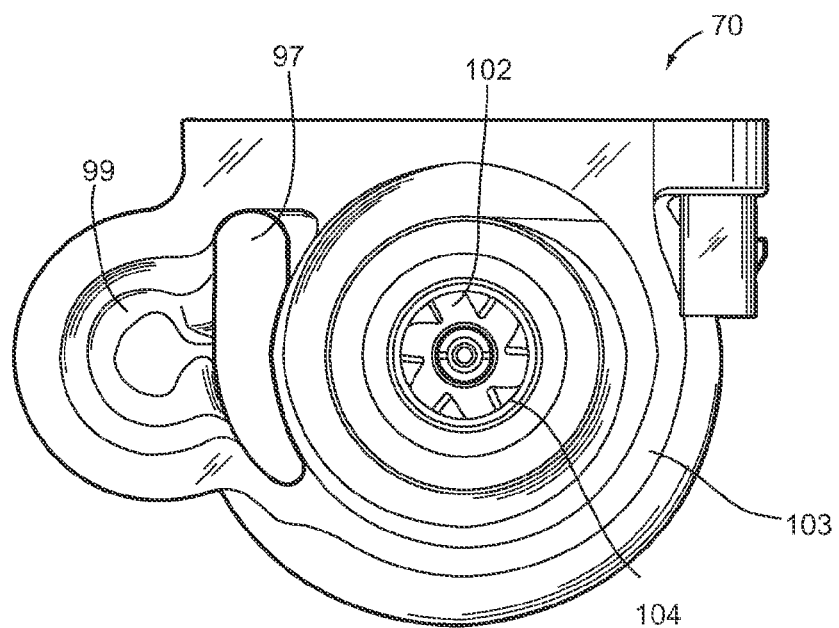

FIGS. 13-14 are end views of the device in FIGS. 9-10.

Figure 15:
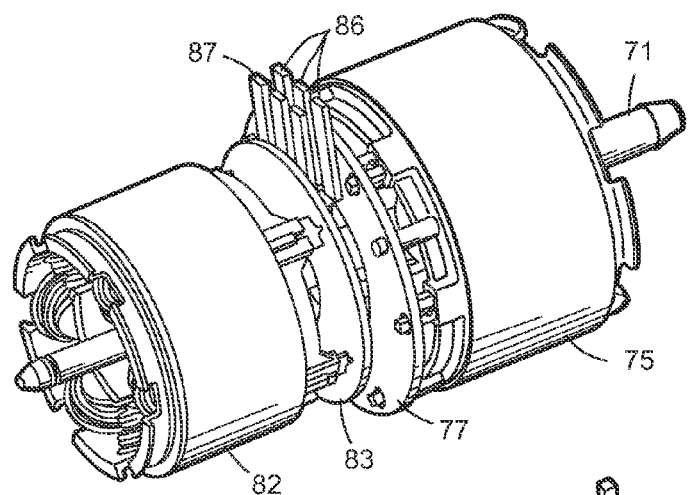
FIG. 15 is a perspective view of the device in FIGS. 9-10 with the over-molded polymeric material of the stator removed to show the stator windings, end plates with motor control connector circuits and rotor position sensors, and related components.

FIG. 15 is a perspective view of the device in FIGS. 9-10 with the uni-body 85 of over-molded polymeric material of the stators removed to show the stator windings, FIG. 15 also showing end plates with motor control connector circuits and rotor position sensors, and related components.

Figure 16:
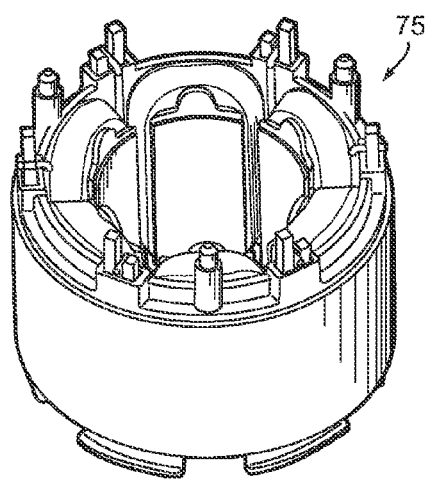
FIGS. 16-17 are perspective views of one motor's stator components in FIG. 15 with the over-molded polymeric material of the stator removed, FIG. 16 having the end plate removed and FIG. 17 having the end plate assembled.
Figure 17:
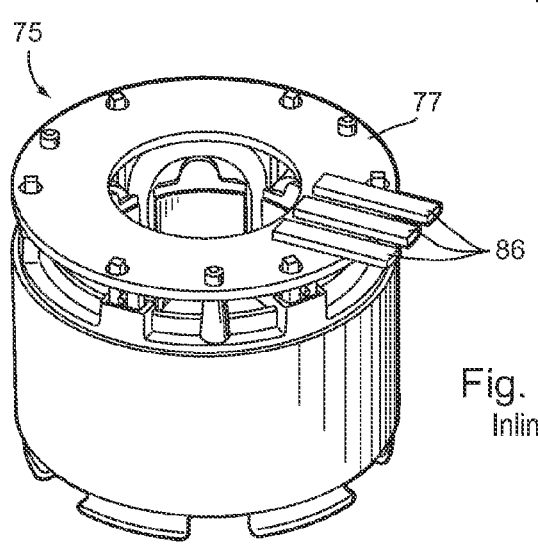

FIGS. 16-17 are perspective views of one motor's stator components in FIG. 15 with the over-molded polymeric material of the stator removed, FIG. 16 having the end plate removed and FIG. 17 having the end plate assembled.

Figure 18:
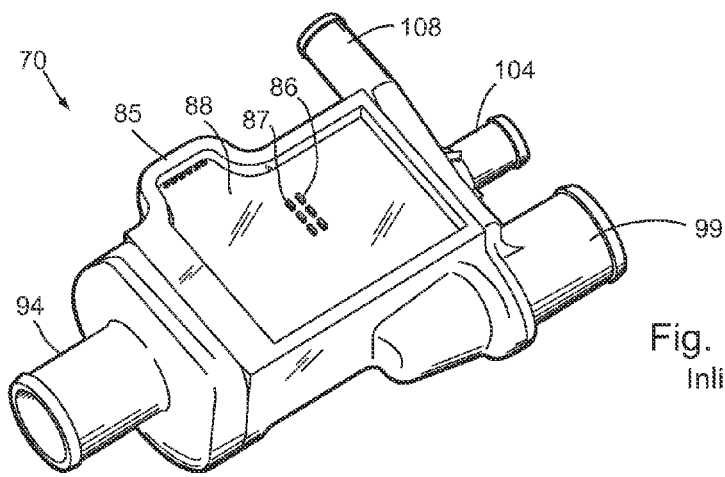
FIG. 18 is a perspective view of the device of FIG. 20 but with the PCB board removed to expose the PCB board.

FIG. 18 is a perspective view of the device of FIG. 10 but with the PCB board removed to expose an outboard side of the PCB board.

Second Modification

Figure 24:
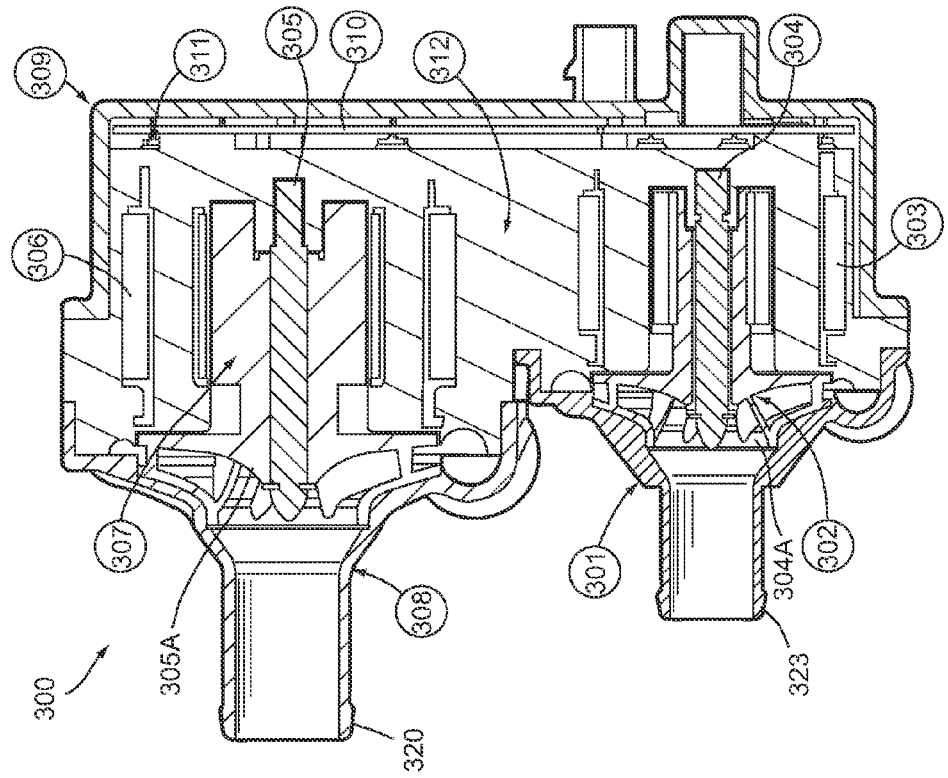
FIG. 24 is a view similar to FIG. 21.

The present device 300 (FIGS. 19-20) is a device similar to the device shown in FIGS. 5-6, but further improved. The device 300 is a side-by-side dual motor, double-pump, and single-control arrangement including side-by-side shafts (FIG. 22) with first and second motors adjacently positioned in side-by-side relation. As shown in FIG. 24, the components include an auxiliary upper volute 301 (also called "pump casing cap" herein), an auxiliary rotor assembly 302, an auxiliary stator assembly 303, an auxiliary pump shaft 303 with pump impellers 304A, a main pump shaft 105 with pump impellers 305A, a main stator assembly 306, a main rotor assembly 307, a main upper volute 308 (also called "pump casing cap" herein), a printed circuit board (PCB) cover 309, a printed circuit board 310 providing controls for the two motors, a plurality of motor terminals 311 (six being illustrated), and a housing overmold 312. It is contemplated that the adjacent motors and pumps can be varied substantially and still be within a scope of the present invention. Accordingly, although the illustrated components are described using the words "auxiliary" and "main", this is not intended to be unnecessarily limiting.

The first main motor includes components 305-307 and the main pump includes components 305A, 308 and some pump casing portions and pump fluid passages being created by the housing 312. Also, the second (auxiliary) motor includes components 302-304, and the second (auxiliary) pump includes components 304A, 301 and some pump casing portions and pump fluid passages being created by the housing 312. The performance of the first and second motors and pumps can be designed for particular applications. For example, a prototype like that shown in FIG. 24 has been constructed for use on a passenger vehicle, where the auxiliary pump creates a flow of 0-20 LPM, a pressure of about 60 kPa, handling fluid temperatures of −40 to 120 degrees C., with minimum voltage of 9 volts, shaft speed of 800-4500 RPM, and shaft torque of 0.065-0.12 Nm. Also in the example, the main pump creates a flow of 0-80 LPM, a pressure of about 60 kPa, handling fluid temperatures of −40 to 120 degrees C., with minimum voltage of 9 volts, shaft speed of 500-5000 RPM, and shaft torque of 0.25-0.50 Nm.

The PCB 310 is operably connected to sensors on the motors and pumps for sensing a position and controlling operation of their respective rotors for motor control in relation to pump conditions and desired pump operation. The uni-body 312 (also called a "housing" or "housing overmold") is a polymeric material over-molded onto and encapsulating a majority of the stators 303 and 306. The housing 312 holds the stators 303 and 306 in a parallel adjacent position on the respective shafts 304 and 305. Notably, the rotor-interfacing surfaces of the stators 303 and 306 are not completely covered with polymeric material, thus providing optimal close interfaced operation with an outer surface of the rotors 302 and 307. Electrical contact tabs (terminals) 311 extend from the uni-body 312 for connection to a printed circuit board (PCB 310), which acts as a controller for the motors and pumps. The PCB 310 provides an on-board control over the two motors, and can be made responsive to a master vehicle electrical system circuit and control device. A cover covers the PCB 310 to protect the circuitry and keep out moisture.

The illustrated side-by-side pumps are formed at outboard ends of the two motors on the same side of the device 300 and their input and output passageways extend in parallel directions, though it is contemplated that the pumps could be on opposite sides of the housing 312 and/or their outlets could be in different directions if a particular application required that. It is contemplated that the impellers of each pump can be a separate part or can be formed from over-molded polymeric material that also encapsulates magnets and other components of the rotors. Notably, the present innovation is believed to encompass several ways for forming and/or attaching the impeller. For example, the impeller can be a two-piece or multi-piece assembly or a unitary molding by itself, or a unitary molding that also forms part of the rotor itself.

The illustrated first pump includes an inlet 320, outlet 321, and pump cavity 322 formed by the upper volute 308 and housing 312, with the pump impeller 305A within the cavity 322. The illustrated second pump includes an inlet 323, outlet 324, and pump cavity 325 formed by the auxiliary volute 301 and housing 312, with the pump impeller 304A within the cavity 325. The inlet and outlets 320, 321, 323, 324 include a lip for secure connection to a hose or conduit to convey liquid, such as antifreeze, transmission fluid, power steering fluid, turbocharger coolant or other coolant.

Figure 19:
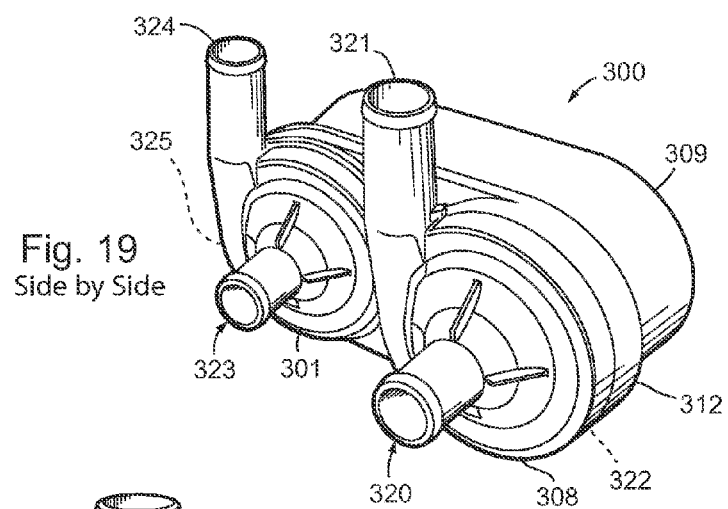
FIGS. 19-20 are left and right perspective views of a side-by-side dual motor, pump, and control device.
Figure 20:
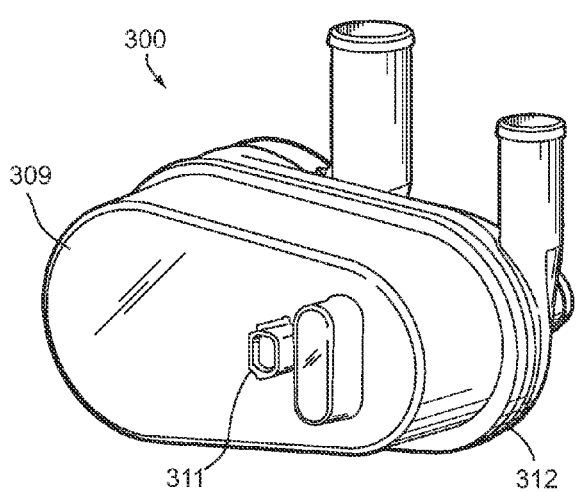
Figure 21:
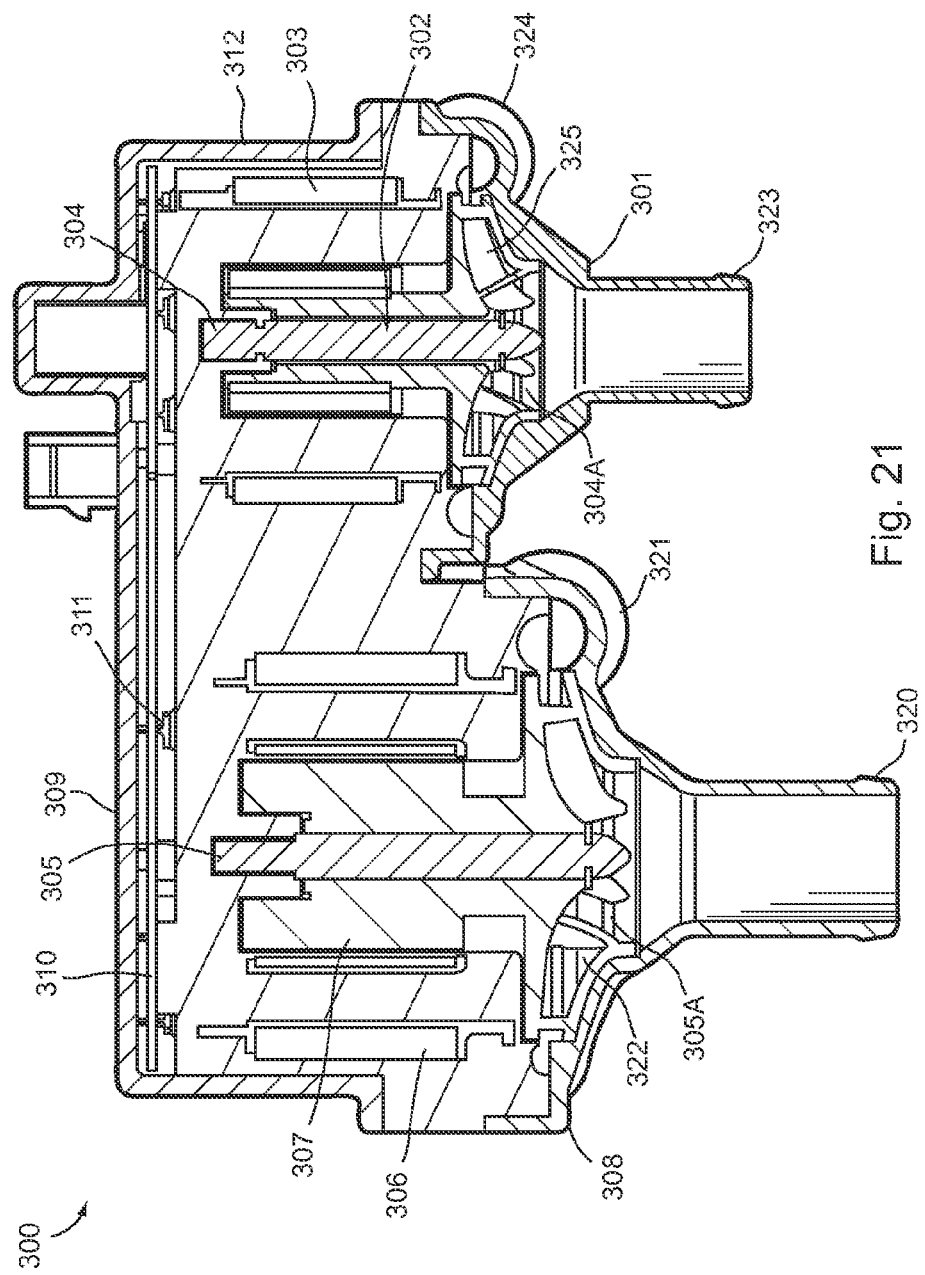
FIG. 21 is a longitudinal cross section of the device of FIGS. 19-20, showing a flow of fluid through the two pumps.
Figure 22:
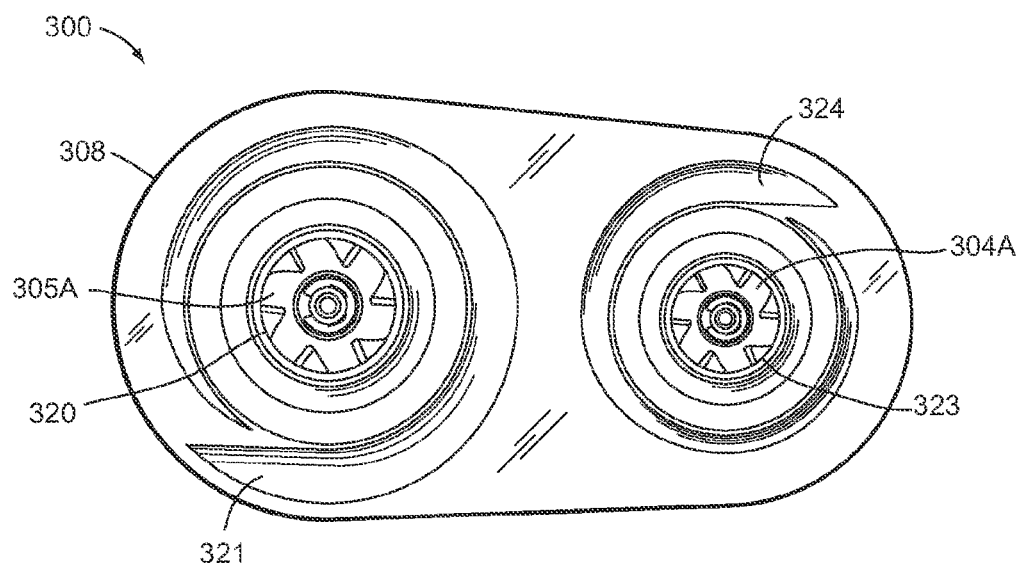
FIG. 22 is an end view of the device in FIG. 20.
Figure 23:
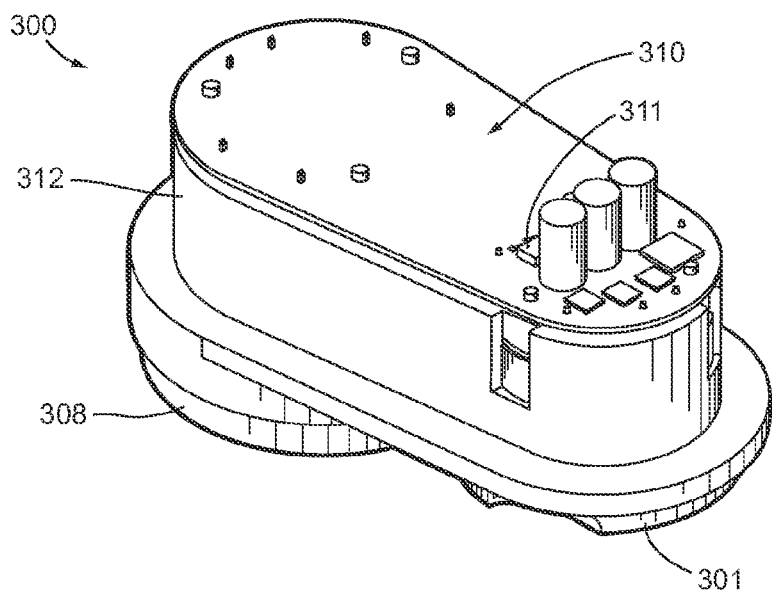
FIG. 23 is a perspective view of the device of FIG. 20 but with the PCB cover removed to expose the PCB board.

FIG. 21 is a longitudinal cross section of the device of FIGS. 19-20, showing a flow of fluid through the two pumps, and FIG. 22 is an end view of the device in FIG. 20. FIG. 23 is a perspective view of the device of FIG. 20 but with the PCB board removed to expose the PCB board, and FIG. 24 is a view similar to FIG. 21.

Third Modification

Figure 27:
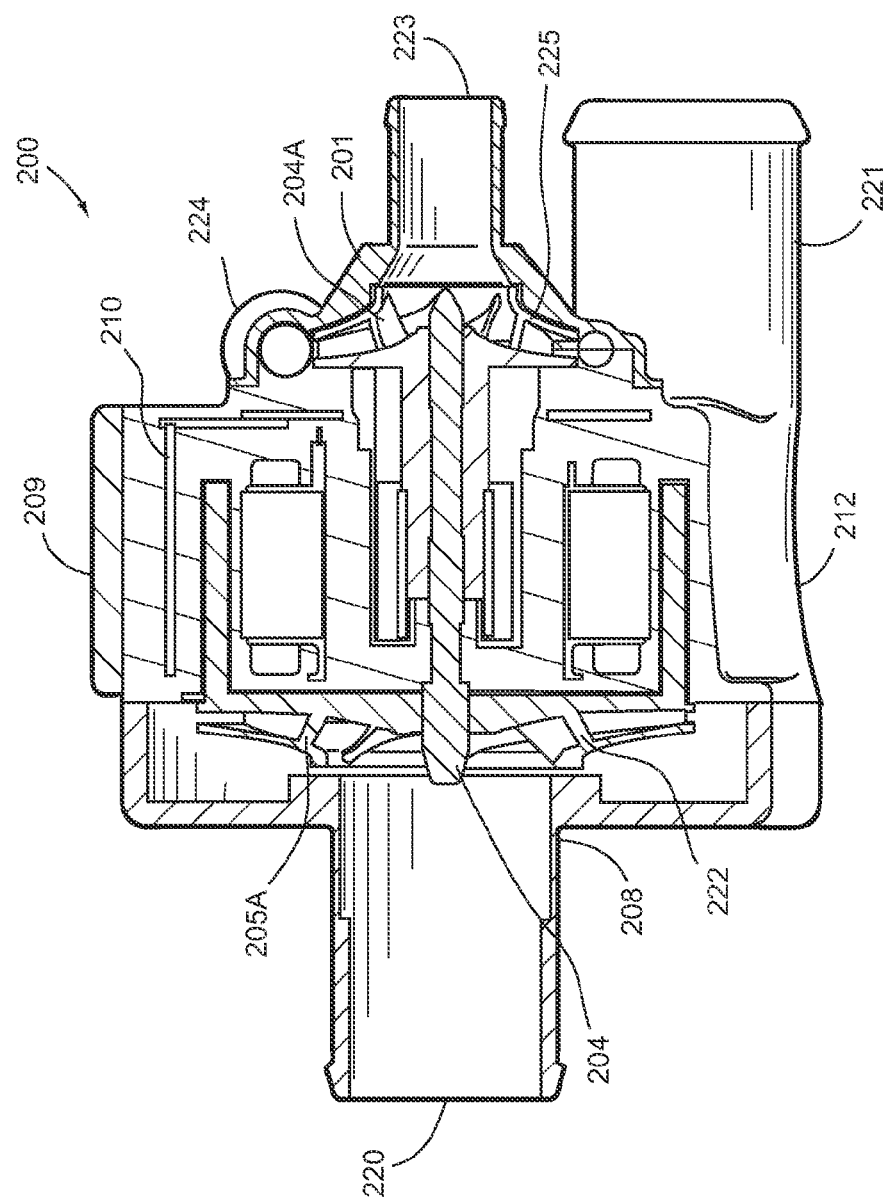
FIG. 27 is a longitudinal cross section of the device of FIGS. 25-26, showing a flow of fluid through the two pumps and cooling of a printed circuit board (PCB) controller.
Figure 28:
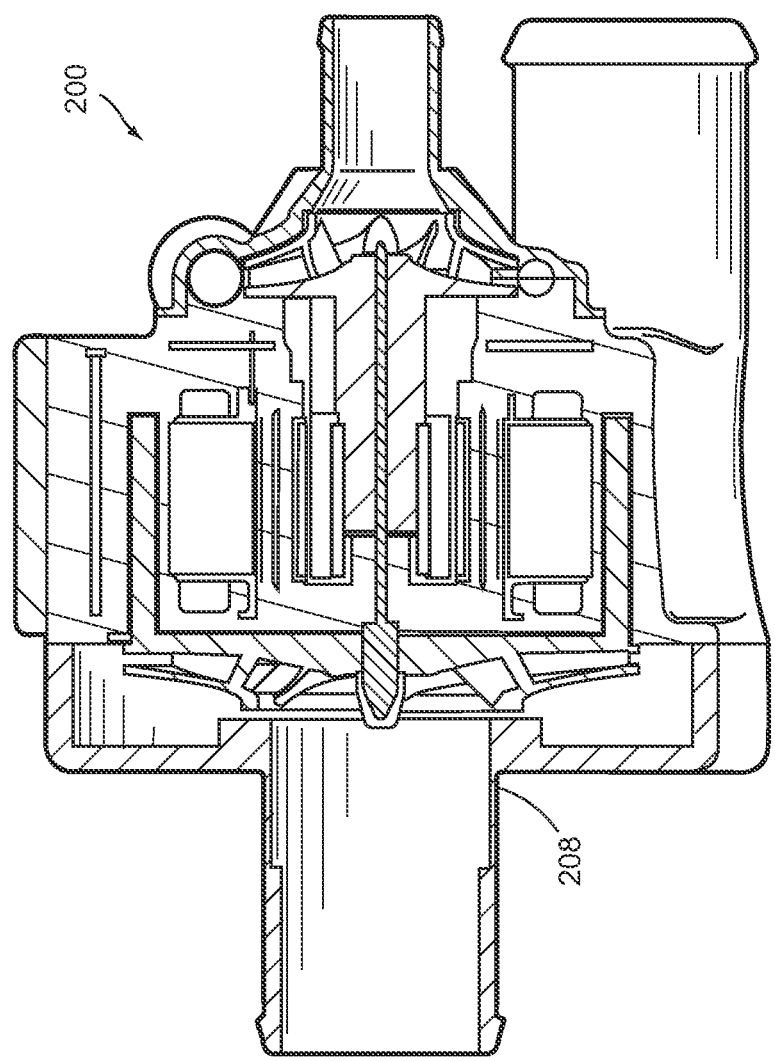
FIG. 28 is an enlarged view similar to FIG. 27.
Figure 29:
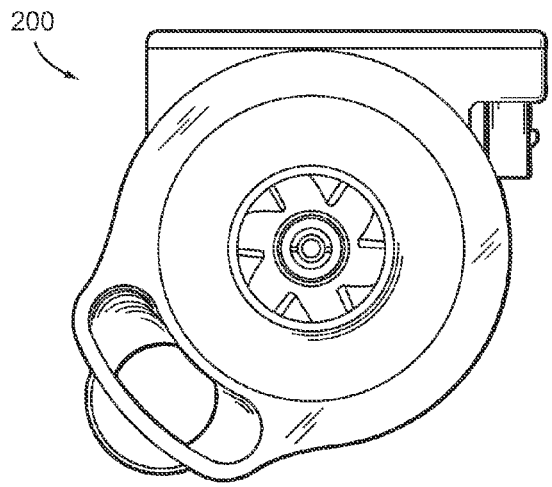
FIGS. 29-30 are end views of opposite ends of the device in FIGS. 25-26.
Figure 30:
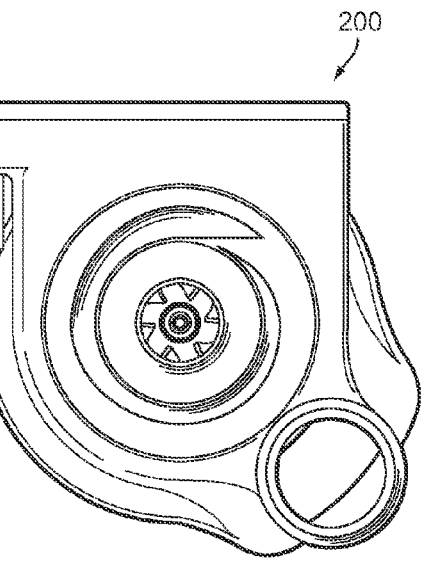
Figure 36:
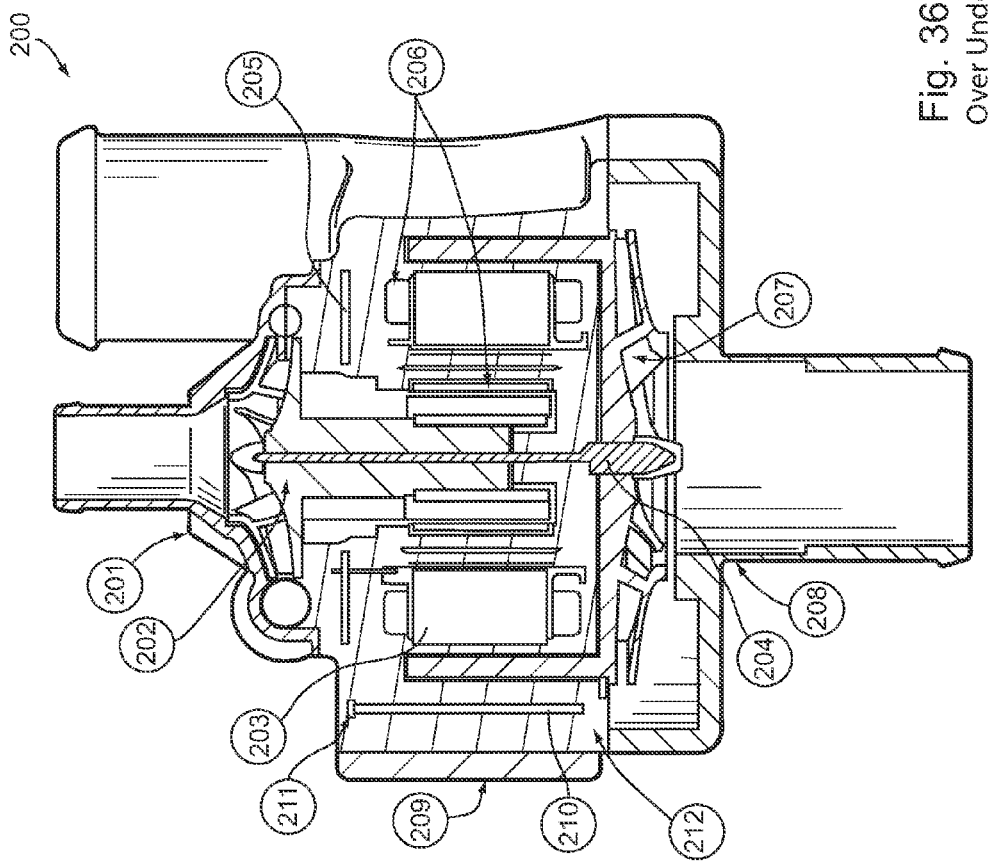
FIG. 36 is a longitudinal (side) cross sectional view similar to FIGS. 27-28.

Present device 200 (FIGS. 25-26) is a device similar to the device shown in FIGS. 5-6, but further improved. The device 200 is an inside-outside dual motor (also called "over under dual motor"), double-pump, and single-control arrangement including a first inside motor positioned substantially inside a second outside motor. As shown in FIGS. 27-28, and 36, the components include an auxiliary upper volute 201 (also called "pump casing cap" herein), an auxiliary rotor assembly 202 (also called an "auxiliary rotor"), an auxiliary stator assembly 203 (also called auxiliary "stator" herein), a shaft 204 with pump impellers 204A and 205A at each end, a termination substrate 205, copper windings 206 wrapped onto protrusions of the stator lamination stack 206A forming a main statorassy (also called a "main stator" herein), a main rotor assembly 207 (also called a "main rotor"), a main upper volute 208 (also called "pump casing cap" herein), a printed circuit board (PCB) cover 209, a printed circuit board (PCB) 210 providing controls for the two motors, a plurality of motor terminals 211 (six being illustrated), and a housing overmold 212. It is contemplated that the adjacent motors and pumps can be varied substantially and still be within a scope of the present invention. Accordingly, although the illustrated components are described using the words "auxiliary" and "main", this is not intended to be unnecessarily limiting.

The performance of the first and second motors and pumps can be designed for particular applications. For example, a prototype like that shown in FIG. 36 has been constructed for use on a passenger vehicle, where the auxiliary pump creates a flow of 0-20 LPM, a pressure of about 60 kPa, handling fluid temperatures of –40 to 120 degrees C., with minimum voltage of 9 volts, shaft speed of 800-4500 RPM, and a shaft torque of 0.065-0.12 Nm. Also in the example, the main pump creates a flow of 0-80 LPM, a pressure of about 60 kPa, handling fluid temperatures of –40 to 120 degrees C., with minimum voltage of 9 volts, shaft speed of 500-5000 RPM, and shaft torque of 0.25-0.50 Nm.

The PCB 210 is operably connected to sensors on the motors and pumps for sensing a position and controlling operation of their respective rotors for motor control in relation to pump conditions and desired pump operation. The uni-body 212 (also called a "housing" or "housing overmold") is a polymeric material over-molded onto and encapsulating a majority of the stators 203 and 206/206A. The housing 212 holds the stators 203 and windings 206 in position around the shaft 204. Notably, the rotor-interfacing surfaces of the stator 203 are not completely covered with polymeric material, thus providing optimal close interfaced operation with the effective surface of the rotors 202 and 207. Electrical contact tabs (terminals) 211 extend from the uni-body 212 for connection to a printed circuit board (PCB 210), which acts as a controller for the motors and pumps. The PCB 210 provides an on-board control over the two motors and can be made responsive to a master vehicle electrical system circuit and control device. A cover covers the PCB 210 to protect the circuitry and keep out moisture.

The illustrated pump impellers are located at opposite ends of the device 200, with the their respective inlets 220 and 223 being aligned at opposite sides of the housing 212, and with the respective outlets 221 and 224 facing laterally at 90 degree orientations relative to each other. Notably, it is contemplated that the outlets could extend in different directions if a particular application required that. It is contemplated that the impellers of each pump can be a separate part or can be formed from over-molded polymeric material that also encapsulates magnets and other components of the rotors. Notably, the present innovation is believed to encompass several ways for forming and/or attaching the impeller. For example, the impeller can be a two-piece or multi-piece assembly or a unitary molding by itself or a unitary molding that also forms part of the rotor itself.

The illustrated first pump includes an inlet 220, outlet 221, and pump cavity 222 formed by the upper volute 208 and housing 212, with the pump impeller 205A within the cavity 222. The illustrated second pump includes an inlet 223, outlet 224, and pump cavity 225 formed by the auxiliary volute 201 and housing 212, with the pump impeller 204A within the cavity 225. The inlet and outlets 220, 221, 223, 224 each include a lip for secure connection to a hose or conduit to convey liquid, such as antifreeze, transmission fluid, power steering fluid, turbocharger coolant or other coolant.

Figure 31:
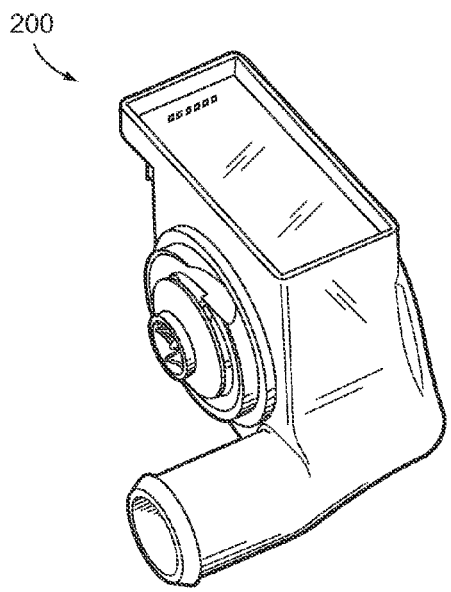
FIG. 31 is a view similar to FIG. 25 but taken from a bottom side and having the main upper volute (208) and PCB cover (209) removed to better show underlying components.
Figure 32:
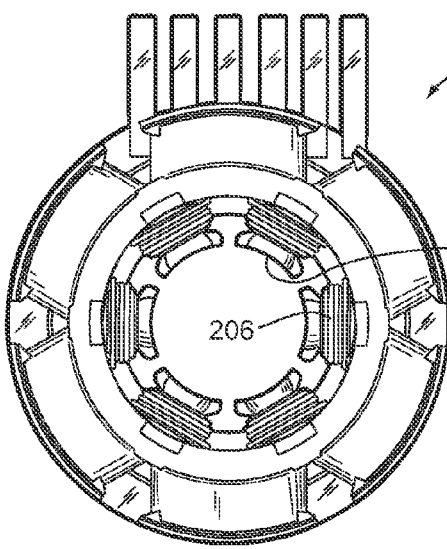
FIGS. 32-33 are top and perspective views of the stator assembly of FIG. 28.
Figure 33:
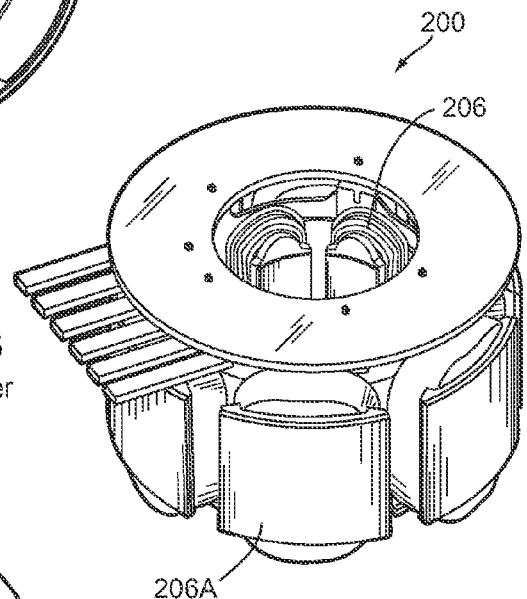
Figure 34:
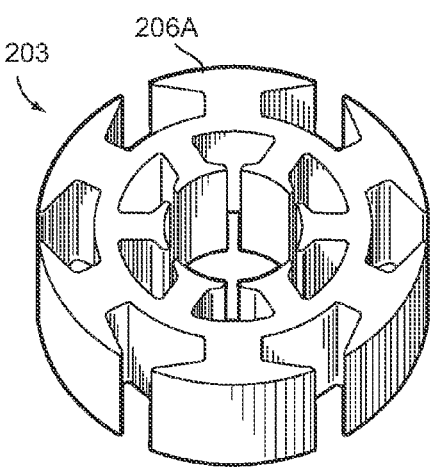
FIGS. 34-35 are perspective and top views of the lamination stack of the stator of FIGS. 32-33, the lamination stack providing a shared magnetic flux carrier where a single stator laminate stack for both an 'in-wound' and an 'out-wound' stator assembly.
Figure 35:
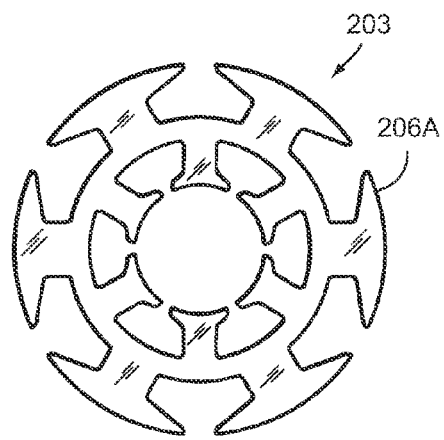

FIG. 31 is a view similar to FIG. 25, but taken from a bottom side and having the main upper volute (208) and PCB cover (209) removed to better show underlying components. FIGS. 32-33 are top and perspective views of the stator assembly of FIG. 28, and FIGS. 34-35 are perspective and top views of the lamination stack of the stator of FIGS. 32-33. Also, FIG. 36 is a longitudinal (side) cross sectional view similar to FIGS. 27-28. Notably, as illustrated, fluid pumped through the device 200 by the two pumps both cools the device 200 (including cooling of the PCB 210) and also acts as a lubricating coating on the rotor assemblies.

In regard to the lamination stack in FIGS. 32-33, an object of the present invention is to provide a shared magnetic flux carrier. For example, as illustrated, it would include a single stator laminate stack with in-wound and out-wound stator teeth for both an 'in-wound' and an 'out-wound' stator assembly. The illustrated lamination stack includes a common back iron that channels the flux between the out-wound stator teeth and the in-wound stator teeth along substantially discrete flux paths on the same back iron. It is possible to press two individual stator stacks together either with or without a separator sleeve. However, it is contemplated that it is not only possible but advantageous to use a single lamination for two stator assemblies driving two separate rotors and pumps for two discrete output parameters.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A combination dual pump and dual motor device comprising:
a housing overmold;
a shaft having a overmold-supported portion supported by the housing overmold in an intermediate location with first and second ends extending in opposite directions from the overmold-supported portion;
an auxiliary upper volute attached to the housing overmold and with the housing overmold defining a first pump cavity at the first end and an auxiliary inlet to the first pump cavity and an auxiliary outlet from the first pump cavity;
an auxiliary rotor assembly operably engaging the first end of the shaft and having an auxiliary pump impeller in the first pump cavity;
a main upper volute attached to the housing overmold and with the housing overmold defining a second pump cavity at the second end and a main inlet to the second pump cavity and a main fluid exit passageway and a main outlet from the second pump cavity;
a main rotor assembly operably engaging the second end of the shaft and having a main pump impeller in the second pump cavity;
a stator assembly including an auxiliary stator adjacent the auxiliary rotor assembly and a main stator adjacent the main rotor assembly, and including windings on each of the auxiliary and main stators for causing independent rotation of the auxiliary rotor assembly and the main rotor assembly, respectively;
a printed circuit board mounted to the housing overmold and programmed to independently control the auxiliary and main rotor assemblies;
a circuit board cover attached to the housing overmold and covering the printed circuit board; and
terminals operably connected to the PCB and extending from the housing overmold for connection to motors control system outside the device.

2. The combination device in claim 1, wherein the main inlet and main outlet extend in opposite directions but extend parallel to a center axis defined by the shaft.

3. The combination device in claim 1, wherein the main inlet and main outlet extend from opposite ends of the device.

4. The combination device in claim 1, wherein three of the main inlet, main outlet, auxiliary inlet and auxiliary outlet extend from a same end of the device.

5. The combination device in claim 1, wherein the main inlet and auxiliary inlet extend co-linearly with the shaft of the device.

6. The combination device in claim 1, wherein the main volute defines the main inlet as aligned with the first end of the shaft, and defines a main fluid passageway that extends from the main pump cavity laterally from and then parallel the shaft toward the main outlet located at the second end of the shaft, the housing overmold being made of a polymer with thermal conductivity of greater than 0.02 w/m·K at 25 degrees C. so that heat generated by the main rotor assembly is communicated through the housing overmold to the main fluid passageway.

7. The combination device in claim 1, wherein the auxiliary volute defines the auxiliary inlet as aligned with the second end of the shaft, and defines an auxiliary fluid passageway that extends from the auxiliary pump cavity laterally from toward the auxiliary outlet located at the second end of the shaft, the housing overmold being made of a polymer with thermal conductivity of greater than 0.02 w/m·K at 25 degrees C. so that heat generated by one or both of the main rotor assembly and the PCB assembly is communicated through the housing overmold to the auxiliary fluid passageway.

8. The combination device in claim 1, wherein the overmold-supported portion of the shaft is a single continuous section of the shaft and is located closer to the second end of the shaft than the first end of the shaft.

9. The combination device in claim 1, wherein the stator assembly includes a plurality of laminate components defining a single stator laminate stack having both in-wound and out-wound stator teeth, the in-wound stator teeth forming part of the first stator and the out-wound stator teeth forming part of the second stator.

* * * * *